(12) United States Patent
Sun et al.

(10) Patent No.: US 12,228,640 B2
(45) Date of Patent: Feb. 18, 2025

(54) DETECTION OF PIPE FEATURES WITH PRESSURE PULSES

(71) Applicant: Halliburton Energy Services, Inc., Houston, TX (US)

(72) Inventors: Zhijie Sun, Houston, TX (US); Yang Yu, Singapore (SG); David Bennett, Houston, TX (US); Robert P. Darbe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/351,044

(22) Filed: Jul. 12, 2023

(65) Prior Publication Data

US 2025/0020804 A1    Jan. 16, 2025

(51) Int. Cl.
| | | |
|---|---|---|
| *G01S 15/10* | (2006.01) |
| *F17D 5/00* | (2006.01) |
| *F17D 5/06* | (2006.01) |
| *G01S 15/88* | (2006.01) |

(52) U.S. Cl.
CPC .............. *G01S 15/102* (2013.01); *F17D 5/00* (2013.01); *F17D 5/06* (2013.01); *G01S 15/88* (2013.01)

(58) Field of Classification Search
CPC .......... G01S 15/102; G01S 15/88; F17D 5/00; F17D 5/06
See application file for complete search history.

(56) References Cited

U.S. PATENT DOCUMENTS

| 6,993,963 B1 | 2/2006 | Gudmundsson |
| 2013/0080063 A1* | 3/2013 | Pillai .................... G01V 11/002 |
| | | 702/9 |
| 2014/0190264 A1* | 7/2014 | Barshinger .......... G01N 29/223 |
| | | 73/592 |

(Continued)

FOREIGN PATENT DOCUMENTS

| CN | 110762398 | 2/2020 |
| JP | 2001227933 | 8/2001 |

(Continued)

OTHER PUBLICATIONS

"PCT Application No. PCT/US2023/070173, International Search Report and Written Opinion", Apr. 5, 2024, 10 pages.

*Primary Examiner* — Amine Benlagsir
(74) *Attorney, Agent, or Firm* — DeLizio, Peacock, Lewin & Guerra LLP (57) ABSTRACT

A method comprises generating, via a pulse generator, a first pressure pulse in a fluid in a pipe and detecting, via a transducer, a first reflected pressure pulse based on the first pressure pulse, wherein the first pressure pulse is reflected by a pipe feature to generate the first reflected pressure pulse. The method comprises generating, with the pulse generator, a second pressure pulse at a later time relative to generating the first pressure pulse, wherein timing of generating of the second pressure pulse is such that the second pressure pulse is superposed with the first reflected pressure pulse such that an amplitude of the second pressure pulse is greater than an amplitude of the first pressure pulse. The method comprises detecting, via the transducer, a second reflected pressure pulse based on the second pressure pulse, and detecting a pipe feature based on the second reflected pressure pulse.

18 Claims, 6 Drawing Sheets

(56) References Cited

U.S. PATENT DOCUMENTS

| | | | |
|---|---|---|---|
| 2016/0265351 A1* | 9/2016 | Gajji | E21B 47/18 |
| 2018/0356046 A1* | 12/2018 | Gong | F17D 5/06 |
| 2021/0238978 A1* | 8/2021 | Singh | E21B 47/07 |
| 2021/0238994 A1* | 8/2021 | Singh | E21B 33/13 |
| 2022/0412205 A1* | 12/2022 | Samuel | E21B 47/04 |

FOREIGN PATENT DOCUMENTS

| | | | |
|---|---|---|---|
| JP | 2001227933 A * | 8/2001 | |
| KR | 20190040032 | 4/2019 | |

* cited by examiner

DETECTION OF PIPE FEATURES WITH PRESSURE PULSES

BACKGROUND

In hydrocarbon recovery operations, fluids may be transported through one or more pipes such as tubing and/or casing in a wellbore or a pipeline on/near the surface. In some instances, the pipes develop defects that inhibit the fluid from flowing through the pipes. The location of the pipes (i.e., being under the Earth's surface, on the sea floor, etc.) make it difficult to visually inspect the pipes without altering the state and/or structure of the pipes and surrounding pipes.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to detecting a feature in a pipe with pressure pulses. Aspects of this disclosure can also be applied to detecting more than one feature in one or more pipes with the pressure pulses. In other instances, well-known instruction instances, protocols, structures, and techniques have not been shown in detail in order not to obfuscate the description.

Example implementations relate to utilizing pressure pulses to detect features in a pipe. A pressure pulse may be generated in a pipe by a pulse generator. If a feature (such as a deposition, leak, etc.) is present in the pipe, the pressure pulse may reflect off the feature, and propagate back in the direction of the pulse generator. For example, if a blockage is in a pipe, a pressure pulse may propagate through the pipe (via fluid in the pipe) to the blockage, reflect off of the blockage, and propagate back in the direction of the pulse generating mechanism. A transducer proximate the pulse generator may measure the time it may take the pressure pulse to propagate through the pipe and reflect off a feature in the pipe. Characteristics of the reflected pressure pulse detected by the transducer may be utilized to detect the feature in the pipe. However, in some implementations, the feature may be small such that the signal-to-noise ratio (SNR) of the reflected signal may not be large enough to detect this feature. For example, the amplitude of a pressure pulse reflected by a very thin deposition feature may be very small, or the background noise level of the pressure pulse at the location of the transducer may be high. Under such cases, pipeline features may not be detected or may only be detected with large uncertainty.

In some implementations, two pressure pulses may be generated to detect features in a pipeline. A pulse generator may generate a first pressure pulse in a fluid in a pipe. The first pressure pulse may reflect off of a feature in the pipe and travel back to the pulse generator, further reflecting off of the pulse generator. A transducer proximate the pulse generator may detect the reflected pressure pulse. In response to the detection of the reflected pressure pulse, the pulse generator may generate a second pressure pulse, superposed with the reflected pressure pulse further reflected off of the pulse generator, to reinforce the reflected pressure pulse as it travels back in the direction of the pipe feature. The reinforced reflected pressure pulse may again reflect off of the feature and propagate back in the direction of the pulse generator and transducer. In some implementations, the amplitude of the second pressure pulse may be greater than the amplitude of the first pressure pulse, which may in turn generate a second reflected pressure pulse with a greater amplitude than the first reflected pressure pulse. Thus, the SNR of the second reflected pressure pulse may be higher than the SNR of the first reflected pressure pulse which may enhance the detection of pipe features.

In some implementations, the detected pipe feature may be used to perform a pipe operation. For example, a pipe operation may be initiated, modified, or stopped based on the detected pipe feature. Examples of such pipe operations may include generating another pressure pulse, shutting in the pipe, adjusting a choke on the pipe, repairing the pipe, etc. For instance, the pipe feature may indicate the location of a deposition in the pipe. Accordingly, a pipe operation may be performed to remove the deposition.

Example Systems

Figure 1:
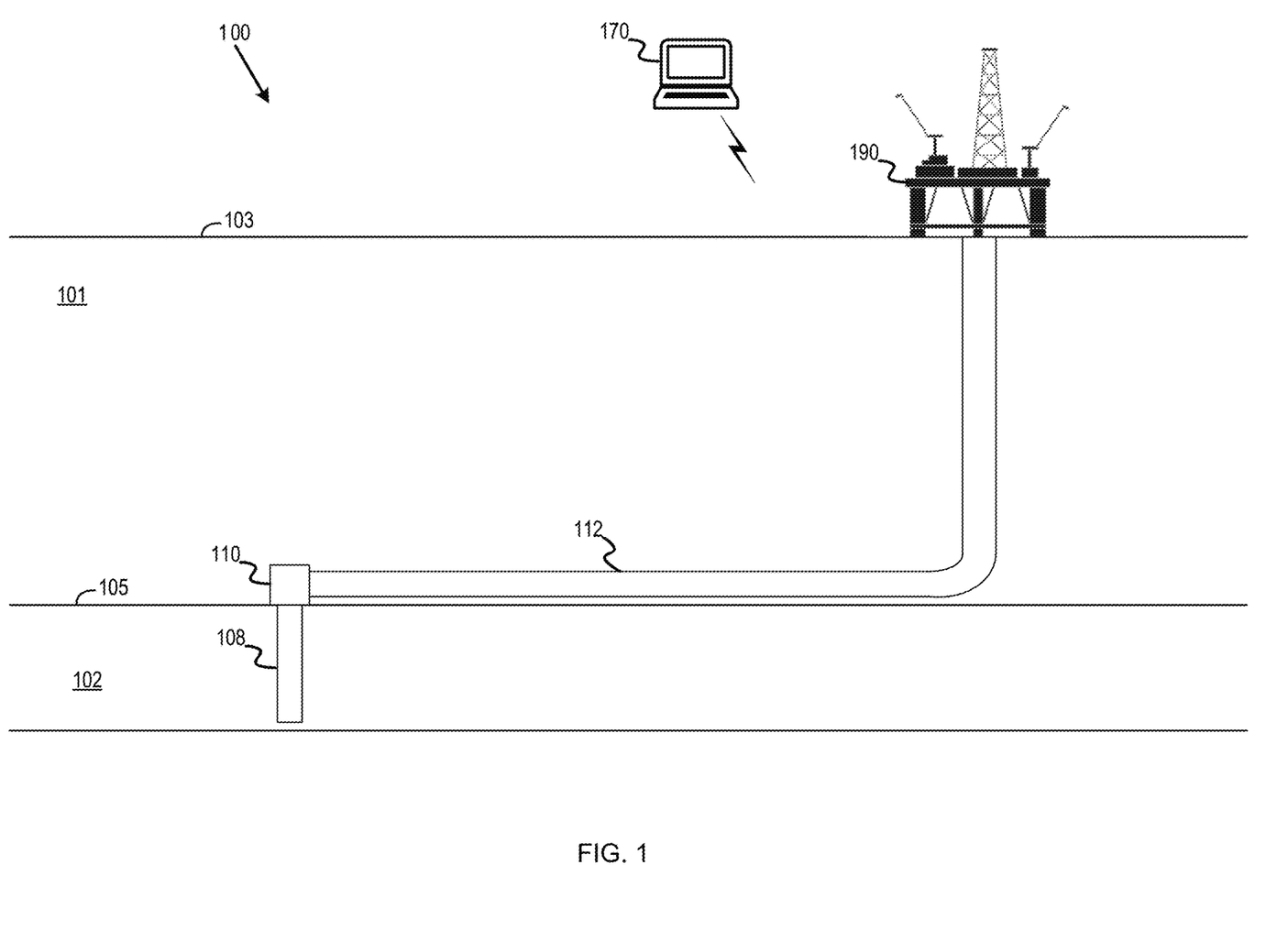
FIG. 1 is a schematic depicting an example pipeline system, according to some implementations.

FIG. 1 is a schematic depicting an example pipeline system, according to some implementations. In particular, FIG. 1 is a schematic of a pipeline system 100 that includes a pipeline 112 configured to transport fluids (e.g., oil, water, and gas) produced from a wellbore 108 formed in a formation 102. A body of water 101 over a formation 102 is bounded at a water surface 103 by a water-air interface and at a water bottom 105 by a water-earth interface. A wellhead 110 for the wellbore 108 may be positioned on the water bottom 105 and coupled to the pipeline 112 such that fluid produced from the wellbore 108 may be transported to a production platform 190 positioned on the water surface 103. In some implementations, one or more features (e.g., leaks, depositions, etc.) may develop in the pipeline 112, inhibiting the flow of fluid through the pipeline 112.

Figure 6:
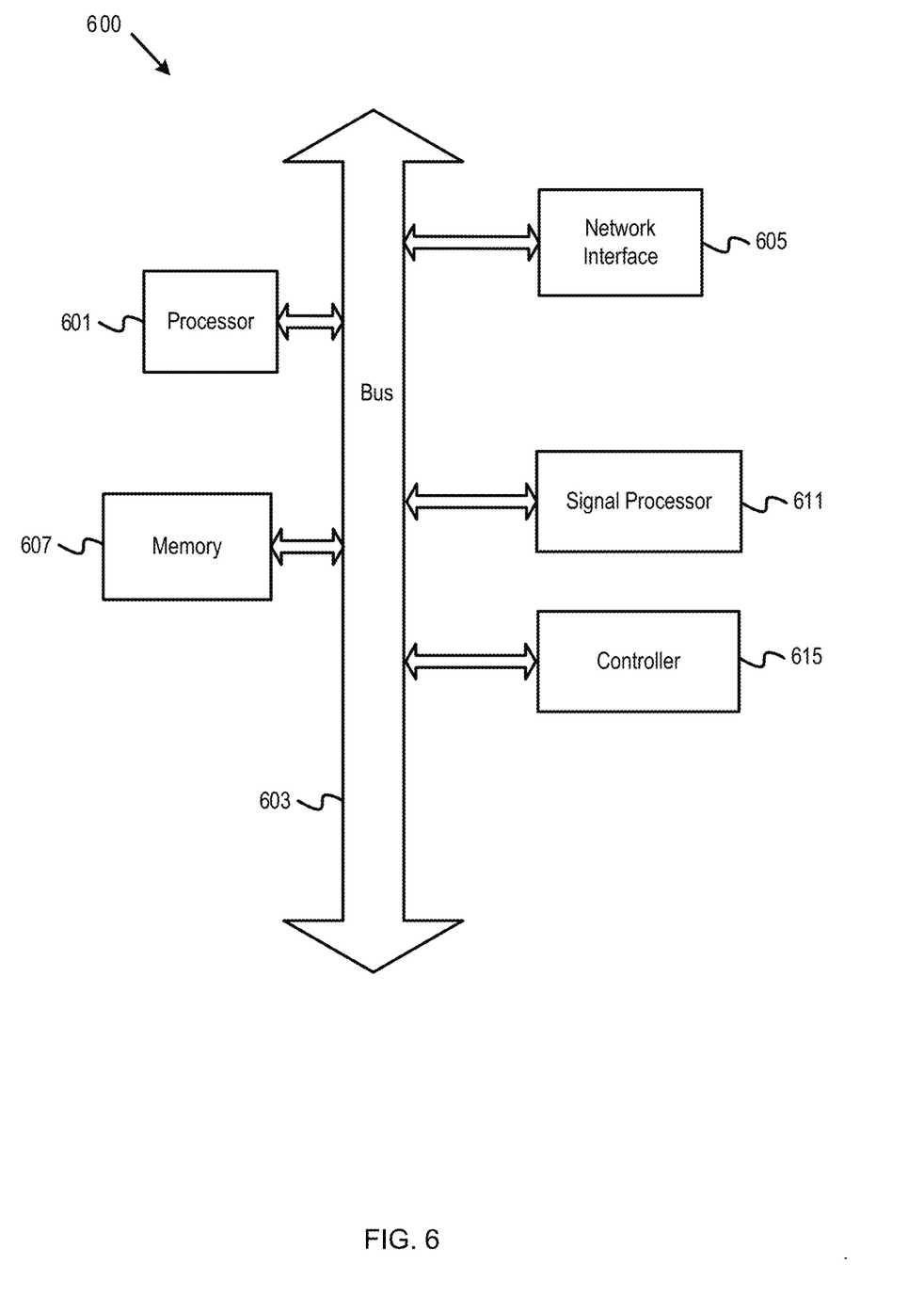
FIG. 6 is a block diagram depicting an example computer, according to some implementations.

The pipeline system 100 includes a computer 170 that may be communicatively coupled to other parts of the pipeline system 100. The computer 170 may be local or remote to the production platform 190 or any other components of the pipeline system 100. A processor of the computer 170 may perform simulations (as further described below). In some implementations, the processor of the computer 170 may control pipe operations of the pipeline system 100 or subsequent pipe operations of other well systems. For instance, the processor of the computer 170 may generate one or more pressure pulses in the pipeline 112, detect one or pipe features based on the one or more pressure pulses, and perform a pipe operation based on the pipe feature. An example of the computer 170 is depicted in FIG. 6, which is further described below.

Although the pipeline 112 is depicted as fluidically connecting the wellbore 108 to the production platform 190, the pipeline 112 may alternatively, or in addition to, be disposed on other midstream components. For example, the pipeline 112 may be fluidically connected to a source of hydrocarbons such as a producing well, a hydrocarbon storage area such as a tank farm or other hydrocarbon storage media, or any other midstream system configured to transport and/or store hydrocarbons and/or water. Additionally, although the pipeline 112 is depicted in a body of water, the pipeline 112 may alternatively, or in addition to, be disposed on land, underneath the surface, etc.

Figure 2:
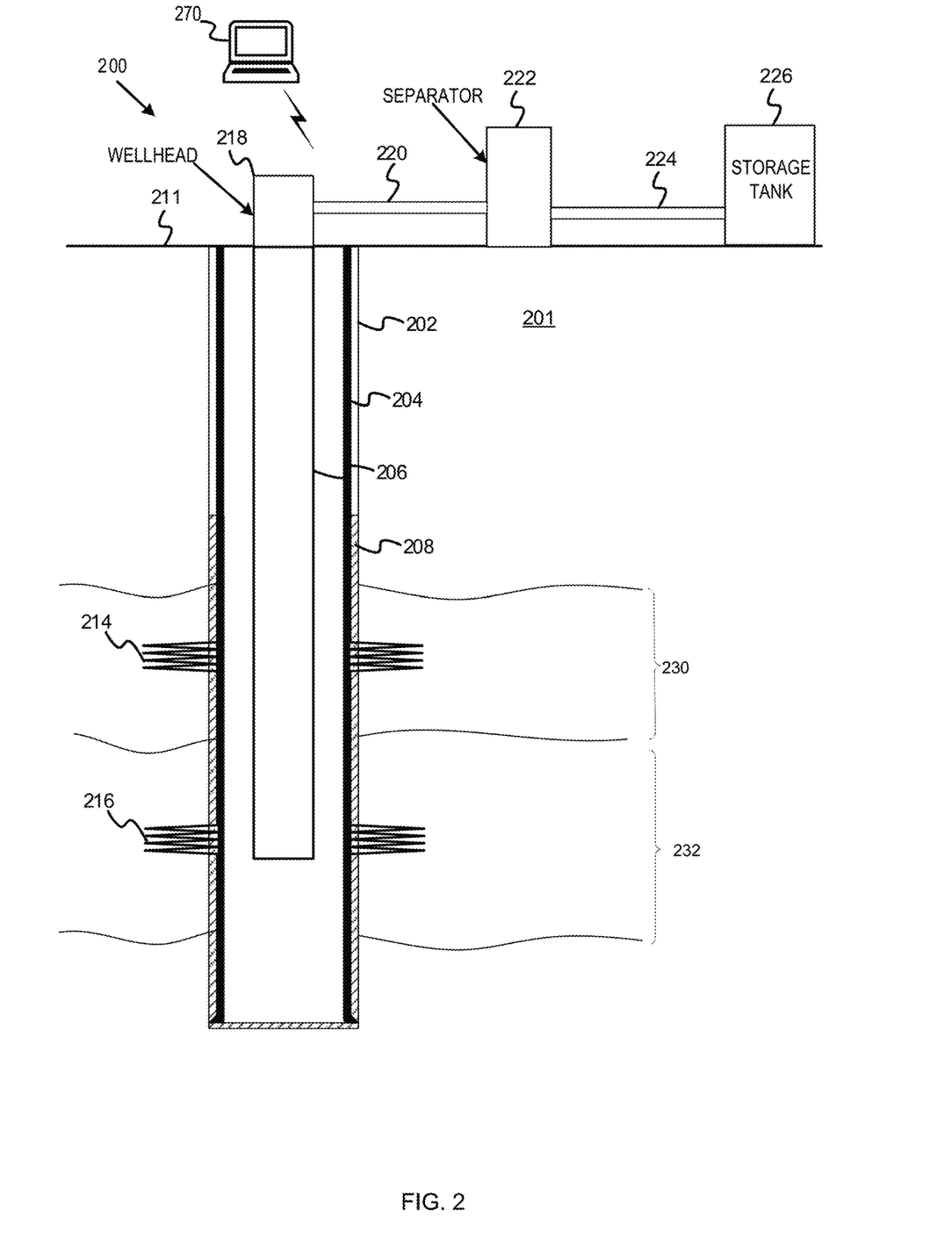
FIG. 2 is a conceptual diagram depicting an example well system, according to some implementations.

FIG. 2 is a conceptual diagram depicting an example well system, according to some implementations. In particular, FIG. 2 is a schematic of a well system 200 that includes a wellbore 202 in a subsurface formation 201. The wellbore 202 may be cased with casing 204, cement 208, and number of perforations 214, 216 being made in the casing 204 and cement 208. Each set of perforations 214, 216 is located in a respective reservoir 230, 232 to allow reservoir fluids (i.e., oil, water, and gas) from the respective reservoirs 230, 232 to flow into the wellbore 202 and into the tubing 206 (the production tubing).

A flowline 220 coupled to the wellhead 218 of wellbore 202 and a separator 222 may allow the fluid produced up the tubing 206 to flow to the separator 222. The separator 222 may be designed to separate the phases of the fluid produced from the wellbore 202. For instance, oil, water, and gas may be separated from each other after passing through the separator 222. The aggregate of fluid produced from wellbore 202 may then flow to a tank battery, via flowline 224, that may include components such as storage tank 226, to store the produced fluid.

In some implementations, one or more features (e.g., leaks, depositions, etc.) may develop in pipes such as casing 204, tubing 206, flowlines 220, 224, etc. Alternatively, features may develop between pipes. For example, a blockage may develop in the annular area between the casing 204 and the tubing 206 in the wellbore 202.

The well system 200 includes a computer 270 that may be communicatively coupled to other parts of the well system 200. The computer 270 may be local or remote to the well system 200 or any other components of the well system 200. A processor of the computer 270 may perform simulations similar to the simulations as the computer 170 of FIG. 1 (as further described below). For example, the processor of computer 270 may generate one or more pressure pulses in a pipe within the well system 200, detect one or pipe features based on the one or more pressure pulses, and perform a pipe operation based on the pipe feature.

Figure 3:
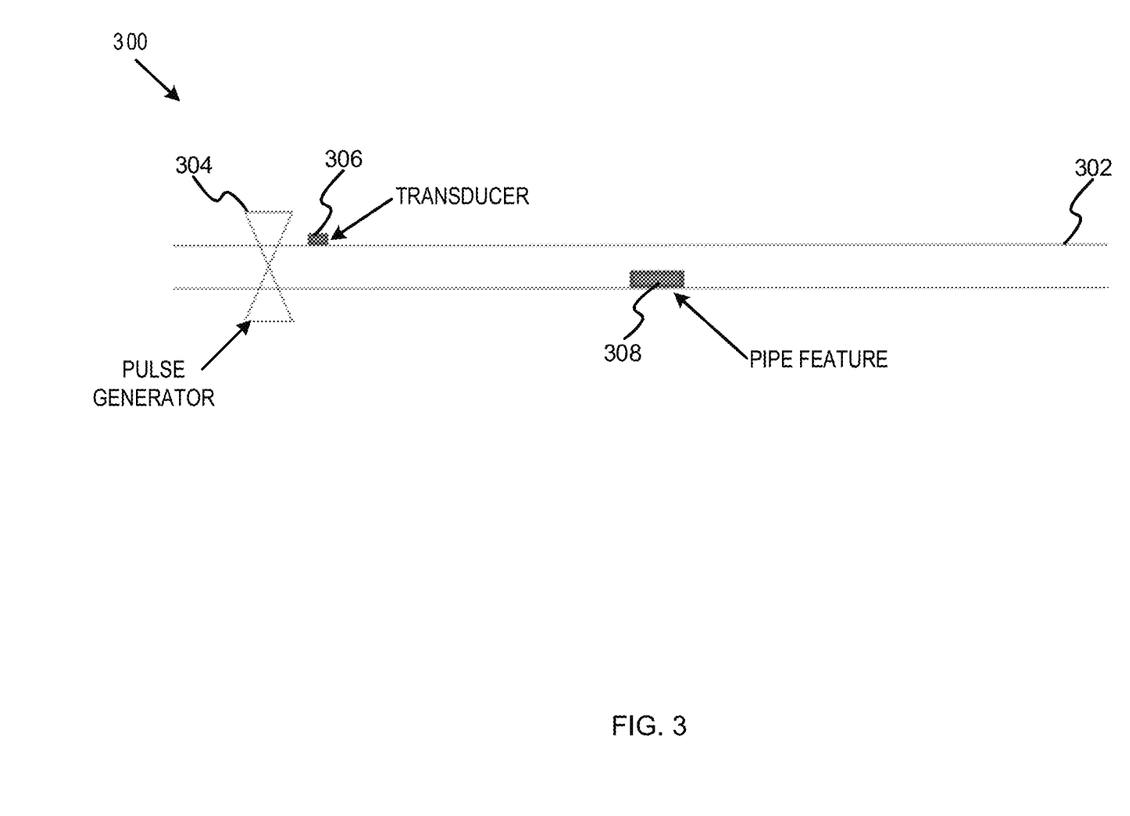
FIG. 3 is a conceptual diagram depicting a pipe feature detection system, according to some implementations.

FIG. 3 is a conceptual diagram depicting a pipe feature detection system, according to some implementations. In particular, FIG. 3 is a schematic of a pipe feature detection system 300. The pipe feature detection system 300 includes a pipe 302 that may be filled with one or more fluids such as oil, water, gas, etc. The pipe 302 may be a pipe such as casing 204, tubing 206, flowlines 220, 224 of FIG. 2. Additionally, the pipe 302 includes a pipe feature 308 such as a split, deposition, etc. that may alter the effective cross sectional area of the pipe relative to the average cross sectional area of the pipe 302.

A pulse generator 304 may generate a pressure pulse in fluid of the pipe 302. The pressure pulse may propagate through the fluid of the pipe 302 in the direction of the pipe feature 308. At least a portion of the pressure pulse may reflect off of the pipe feature 308 to generate a first reflected pressure pulse. For example, a portion of the pressure pulse may reflect off of the pipe feature 308 to generate the first reflected pressure pulse, and a portion of the pressure pulse may continue to propagate through the pipe 302 past the pipe feature 308. The first reflected pressure pulse may then propagate back in the direction of the pulse generator 304. A transducer 306 proximate the pulse generator 304 may detect the first reflected pressure pulse. The first reflected pressure pulse may further reflect off of the pulse generator 304 and propagate back in the direction of the pipe feature.

Example Operations

Figure 4:
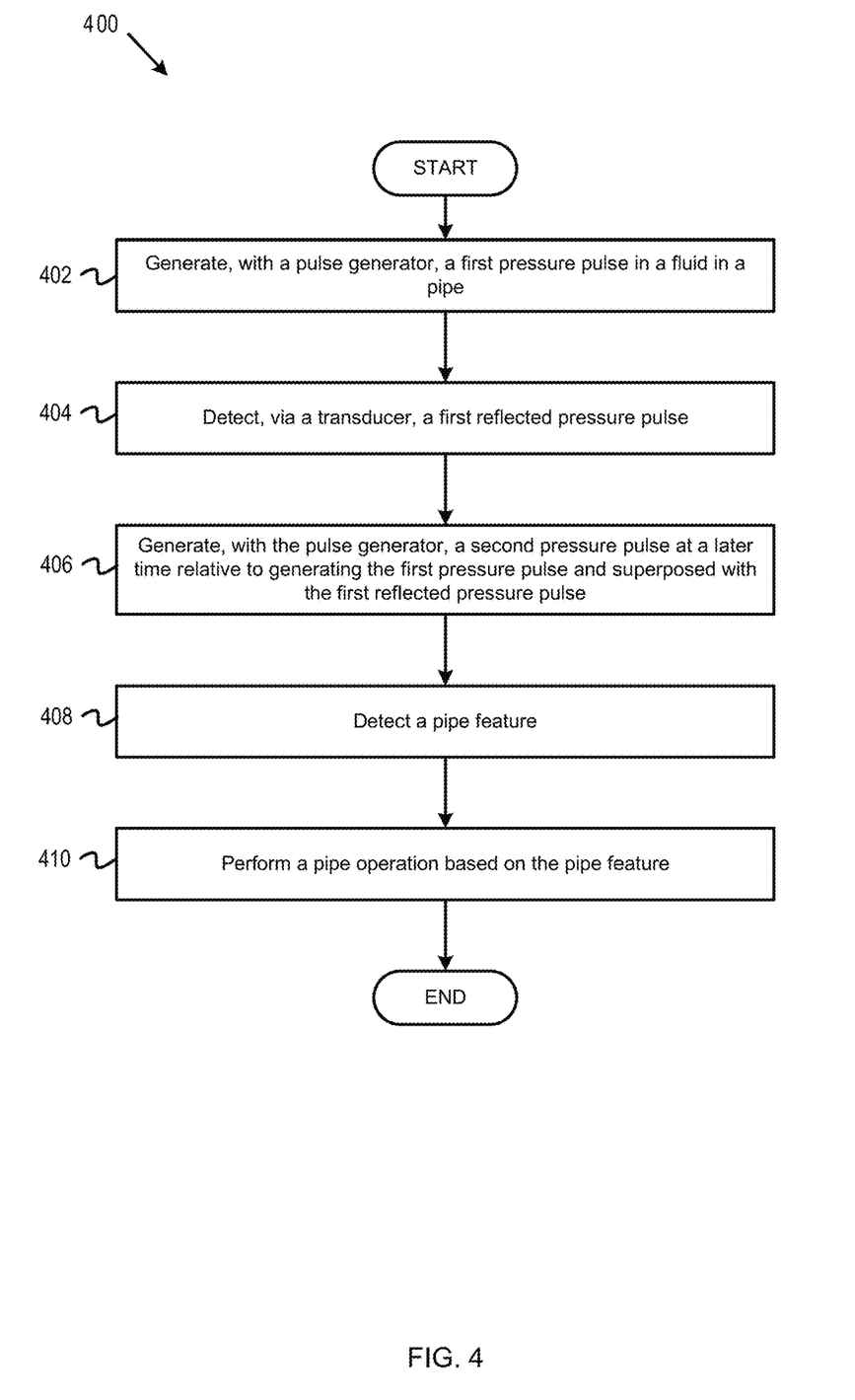
FIG. 4 is a flowchart of example operations for detecting a pipe feature, according to some implementations.

FIG. 4 is a flowchart of example operations for detecting a pipe feature, according to some implementations. In particular, FIG. 4 includes a flowchart 400 of operations to detect pipe features based on two or more pressure pulses generated in the pipe. The pipe described in the operations of flowchart 400 may be a pipe capable of transporting and/or holding fluid, such as one or more pipes in pipeline 112 of FIG. 1, well system 200 of FIG. 2, a water transfer pipeline, a gas pipeline, etc. The operations of flowchart 400 are described in reference to the computer 170 of FIG. 1 and the components of FIG. 3. Additionally, the operations of flowchart 400 are described in reference to FIG. 5. Operations of flowchart 400 begin at block 402.

At block 402, the processor of computer 170 may generate, with a pulse generator, a first pressure pulse in a fluid of a pipe. The pulse generator may include a bleed valve, gas gun, etc. For example, a linear valve may be opened and closed, with an opening time and closing time, to generate the pressure pulse. In some implementations the opening time may be less than, equal to, or greater than the closing time. In some implementations, the pressure pulse may be generated in forms other than a valve opening and closing linearly. For example, a linear valve may be opened according to a sinusoidal signal, a chirp signal, etc. The pressure pulse may be a positive pressure pulse or a negative pressure pulse.

At block 404, the processor of computer 170 may detect, via a transducer, a first reflected pressure pulse. A transducer (such as a pressure transducer) may be proximate the pulse generator to measure the pressure of hydraulic shock as pressure pulses reflect off objects in the pipe, such as a pipe feature, a valve, etc. The pressure pulse generated by the pulse generator may propagate through the fluid in the pipe and reflect off of a pipe feature if a feature is present. For example, there may be an increase in the effective cross sectional area of the pipe (e.g., the pipe is split, corroded, etc.) and/or there may be a decrease in the effective cross sectional area of the pipe (e.g., sand deposition, scale buildup, a liner hanger in a casing, etc.). At least a portion of the pressure pulse may reflect off of the feature to generate the first reflected pressure pulse. The first reflected pressure pulse may propagate back in the direction of the pulse generator. A transducer proximate the pulse generator may measure the time of arrival of the reflected pressure pulse.

In some implementations, it may be known as a priori that a pipe may have a small feature. However, the exact location of the feature may be unknown. Implementations may utilize a model, such as the Joukowsky equation, conservation of mass/momentum, etc., that may describe the pressure pulse wave in a pipe without any features. For instance, the model may predict a pressure in the pipe proximate the transducer to be $\hat{p}(t)$. $p(t)$ may be the actual pressure measured at said location by the transducer. If the absolute error between the predicted pressure and the actual pressure exceeds a threshold $\varepsilon_1$, i.e., $|p(t)-\hat{p}(t)|>\varepsilon_1$, then the instant may be considered the arrival of the first reflected pressure pulse. Alternatively, a pressure derivative with respect to time may be utilized instead of a model. For example, if a pressure derivative exceeds a threshold $\varepsilon_2$, i.e., $$\frac{dp(t)}{dt} > \varepsilon_2,$$

then the instant may be considered the arrival of the first reflected pressure pulse.

A signal-to-noise ratio (SNR) may be determined when the first reflected pressure pulse is detected by the transducer. In some implementations, the noise signal may be too high and/or the signal (e.g., amplitude) of the reflected pressure pulse may be too low such that the SNR is too low, and a pipe feature may not be detectable. For example, an SNR may be less than a threshold. Accordingly, a pipe feature may not be detectable, or a pipe feature may be detected with high uncertainty.

At block 406, the processor of computer 170 may generate, with the pulse generator, a second pressure pulse at a later time relative to generating the first pressure pulse and superposed with the first reflected pressure pulse. At least a portion of the first reflected pressure pulse may further reflect off of the pulse generator and propagate back in the direction of the pipe feature. For example, with reference to FIG. 3, at least a portion of the first reflected pressure pulse may further reflect off of the pulse generator 304 and propagate back in the direction of the pipe feature 308. The pulse generator 304 may generate a second pressure pulse superposed with the first reflected pressure pulse as it propagates back in the direction of the pipe feature 308 to reinforce the first reflected pressure pulse.

Figure 5:
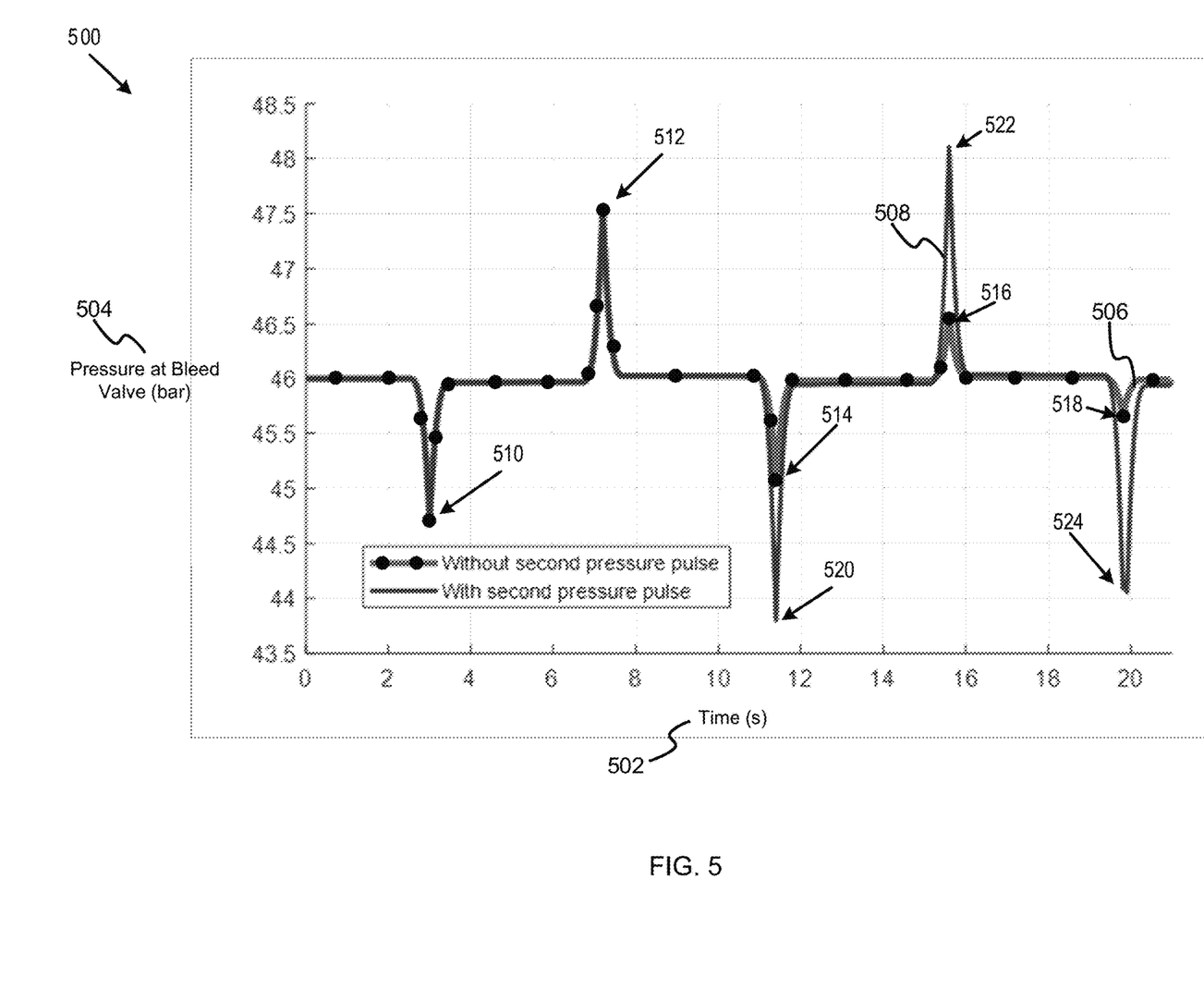
FIG. 5 is a chart depicting an example pressure pulse simulation, according to some implementations.

To help illustrate, FIG. 5 is a chart depicting an example pressure pulse simulation, according to some implementations. More specifically, FIG. 5 includes a chart 500 of a pressure profile of a pipe, where a transducer measures the pressure at a point on the pipe near a bleed valve (i.e., a pulse generator). The chart 500 includes an x-axis 502 and a y-axis 504. The x-axis 502 is time and has a unit of seconds(s). The y-axis 504 is the pressure at the bleed valve and is measured in bar. A bleed valve is used to generate the pressure pulses. Curve 506 depicts the pressure profile of a single pressure pulse. The first pressure pulse 510 is generated at approximately 2.5 seconds with a 0.5 second opening time and a 0.5 second closing time. At least a portion of the first pressure pulse 510 reflects off of a pipe feature at approximately 6.5 seconds to generate a first reflected pressure pulse 512. The first reflected pressure pulse 512 then propagates back in the direction of the bleed valve and is detected back at the transducer at approximately 10.9 seconds. The first reflected pressure pulse 512 then reflects off of the bleed valve to generate a second reflected pressure pulse 514. The second reflected pressure pulse 514 then propagates back in the direction of the pipe feature until at least a portion of the second reflected pressure pulse 514 reflects off of the feature at approximately 15.6 seconds to generate a third reflected pressure pulse 516. The third reflected pressure pulse 516 then propagates back in the direction of the bleed valve and reflects off of the bleed valve at approximately 19.8 seconds to generate a fourth reflected pressure pulse 418. The curve 508 depicts the pressure profile with a second pressure pulse 420. A second pressure pulse 520 is generated by the bleed valve at approximately 10.9 seconds to reinforce the second reflected pressure pulse 514. The reinforced pressure pulse then propagates in the direction of the pipe feature and at least a portion of the reinforced pressure pulse reflects off of the pipe feature to generate a first reflected reinforced pressure pulse 522. The first reflected reinforced pressure pulse 522 may then propagate back in the direction of the bleed valve to reflect off the bleed valve and generate a second reinforced pressure pulse 524 at approximately 19.8 seconds. As can be seen, the reinforced reflected pressure pulses at 15.6 seconds and 19.8 seconds have a higher amplitude than the reflected pressure pulses generated by the first pressure pulse 510. Accordingly, SNR is improved by approximately four times in the depicted example.

Returning to block 406, the second pressure pulse may be generated with the same or different pulse generator than that of the first pressure pulse. For example, the first pressure pulse may be generated by the closure of a mainline valve. The second pressure pulse may be generated by a gas gun proximate to the mainline valve. In some implementations, different pulse waveforms may be used in combination. For example, a simple open and close may be implemented for the first pressure pulse and the second pressure pulse may be generated by one or more valves controlled by a chirp signal.

The second pressure pulse may be generated based on the arrival of the first reflected pressure pulse. For example, the second pressure pulse may be generated when the transducer detects the arrival of the first reflected pressure pulse. In some instances, the second pressure pulse may be generated when the transducer detects the first reflected pressure pulse when a threshold, such as &1 and 22 described in block 404, is exceeded.

In some implementations, the second pressure pulse may be generated based on the acoustic speed of the fluid in a pipe if a potential pipe feature position is known. For instance, an initial diagnosis performed with a single pressure pulse indicates a potential pipe feature may be present at a position (relative to the pulse generator and/or transducer) on the pipe. The SNR may be low such that the pipe feature may be diagnosed with high uncertainty, i.e., it may be unsure if the feature exists in the pipe. Accordingly, a second diagnosis may be performed based on the time of arrival of the reflected pressure pulse of the initial diagnosis to confirm the detection of the pipe feature. For example, a pipe feature detection analysis performed with a single pressure pulse reveals a potential pipe feature is located approximately 2,500 feet away from the pulse generator and transducer. A second diagnostic may be performed by initiating the pulse generator to generate a first pressure pulse (such as the first pressure pulse generated in block 402), then initiating the pulse generator again to generate a second pressure pulse (such as the second pressure pulse generated in block 406). The pipe in this example may be filled with water, and the acoustic speed in water is approximately 5,000 feet per second (ft/sec). Thus, it will take each pressure pulse 1 second to propagate to the feature and back to the pulse generator and/or transducer. Accordingly, the time interval between the generation of the first pressure pulse and the generation of the second pressure pulse may be 1 second such that the second pressure pulse may be generated when the reflection of the first pressure pulse (the first reflected pressure pulse) may be proximate the pulse generator and/or the transducer. Thus, the second pressure pulse may be superposed with the first reflected pressure pulse as it reflects off of the pulse generator and propagates back towards the feature.

At least a portion of the reinforced first reflected pressure pulse (the second pressure pulse superposed with the first reflected pressure pulse) may then reflect off of the pipe feature to generate a second reflected pressure pulse. The second reflected pressure pulse may then propagate back in the direction of the pulse generator. In some implementations, the amplitude of the first pressure pulse is less than the second pressure pulse such that the amplitude of the second reflected pressure pulse is higher than the first reflected pressure pulse, enhancing the detectability of the pipe feature (as described in FIG. 5).

In some implementations, if generating a second pressure pulse does not improve SNR to an acceptable level (i.e., above a minimum threshold), more reinforcement pulses may be generated until the SNR of a reflected signal exceeds a minimum threshold or no more reinforcement pressure pulse are allowable due to pressure limitations of the pipe. Each of the multiple reinforcement pressure pulses may be generated based on similar or different methods. For instance, a first reinforcement pulse may be generated based on a pre-calculated time interval (if an approximate location of the pipe feature may be known), and a second reinforcement pulse may be generated based on an actual pressure response.

In some implementations, the second pressure pulse may be superposed with reflected pressure pulses other than the first reflected pressure pulse. For example, the first reflected pressure pulse may propagate back in the direction of the pipe feature and reflect off of the pipe feature to generate a second reflected pressure pulse. The second reflected pressure pulse may then propagate back in the direction of the pulse generator, further reflecting off of the pulse generator to propagate back in the direction of the pipe feature. The second pressure pulse may then be generated (via the pulse generator) and concurrently superposed with the second reflected pressure pulse to reinforce the second reflected pressure pulse.

At block 408, the processor of the computer 170 may detect a pipe feature. The feature may be detected based on the signal of the second reflected pressure pulse (reinforced with the second pressure pulse). The signal of the second reflected pressure pulse may indicate the type of pipe feature. For example, the amplitude of the second reflected pressure pulse may indicate if the pipe feature is a leak or a deposition. The time of arrival of the first and/or second reflected signal may indicate the position of the pipe feature. For example, the acoustic speed of the fluid in the pipe and the time of arrival of the reflected pressure pulse may be utilized to determine the position of the pipe feature relative to the transducer and/or pulse generator.

At block 410, the processor of the computer 170 may perform a pipe operation based on the pipe feature. A pipe operation may include generating another reinforcement pressure pulse in the pipe to collect more data on the pipe feature, shutting in the pipe, repairing the pipe, etc.

Example Computer

FIG. 6 is a block diagram depicting an example computer, according to some implementations. FIG. 6 depicts a computer 600 for detecting pipe features. The computer 600 includes a processor 601 (possibly including multiple processors, multiple cores, multiple nodes, and/or implementing multi-threading, etc.). The computer 600 includes memory 607. The memory 607 may be system memory or any one or more of the above already described possible realizations of machine-readable media. The computer 600 also includes a bus 603 and a network interface 605. The computer 600 can communicate via transmissions to and/or from remote devices via the network interface 605 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 600 also includes a signal processor 611 and a controller 615 which may perform the operations described herein. For example, the signal processor 611 may process the pressure pulses measured by a transducer to detect a pipe feature. The controller 615 may control a pulse generator to generate one or more pressure pulses and/or perform a pipe operation based on the pipe feature. The signal processor 611 and the controller 615 can be in communication. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for seismic horizon mapping as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Implementations

Implementation #1: A method comprising: generating, via a pulse generator, a first pressure pulse in a fluid in a pipe; detecting, via a transducer, a first reflected pressure pulse based on the first pressure pulse, wherein the first pressure pulse is reflected by a pipe feature to generate the first reflected pressure pulse; generating, with the pulse generator, a second pressure pulse at a later time relative to generating the first pressure pulse, wherein timing of generating of the second pressure pulse is such that the second pressure pulse is superposed, at least in part, with the first reflected pressure pulse such that an amplitude of the second pressure pulse is greater than an amplitude of the first pressure pulse; detecting, via the transducer, a second reflected pressure pulse based on the second pressure pulse; and detecting a pipe feature based on the second reflected pressure pulse.

Implementation #2: The method of Implementation #1, wherein the first reflected pressure pulse is further reflected by the pulse generator, and wherein the timing of generating of the second pressure pulse is such that the second pressure pulse is superposed, at least in part, with the first reflected pressure pulse further reflected by the pulse generator.

Implementation #3: The method of Implementation #1 or 2, wherein the second pressure pulse is reflected by the pipe feature to generate the second reflected pressure pulse.

Implementation #4: The method of any one of more of Implementations #1-3, wherein the second reflected pressure pulse exceeds a threshold for a signal-to-noise ratio.

Implementation #5: The method of any one of more of Implementations #1-4, wherein the pipe feature includes at least one of a deposition, a leak, or a blockage in the pipe.

Implementation #6: The method of any one of more of Implementations #1-5, further comprising: detecting a position of the pipe feature in or on the pipe based on the second reflected pressure pulse.

Implementation #7: The method of any one of more of Implementations #1-6 further comprising: performing a pipe operation based on the pipe feature.

Implementation #8: The method of Implementation #7, wherein performing a pipe operation comprises at least one of removing the pipe feature or replacing at least a section of the pipe having the pipe feature with a new section of pipe.

Implementation #9: A method comprising: generating, via a pulse generator, a first pressure pulse in a fluid in a pipe; detecting, via a transducer, a reflected pressure pulse based on the first pressure pulse, wherein the first pressure pulse is reflected by a pipe feature to generate the reflected pressure pulse; performing the following operations until a signal-to-noise ratio of the reflected pressure pulse exceeds an acceptance threshold, generating, via the pulse generator, a subsequent pressure pulse in the fluid in the pipe, wherein timing of generating of the subsequent pressure pulse is such that the subsequent pressure pulse is superposed, at least in part, with the reflected pressure pulse; and detecting, via the transducer, the reflected pressure pulse; and detecting a pipe feature based on the reflected pressure pulse.

Implementation #10: The method of Implementation #9, wherein the pipe feature includes at least one of a deposition, a leak, or a blockage in the pipe.

Implementation #11: The method of Implementation #9 or 10, further comprising: detecting a position of the pipe feature in or on the pipe based on the reflected pressure pulse.

Implementation #12: The method of any one of more of Implementations #9-11 further comprising: performing a pipe operation based on the pipe feature.

Implementation #13: The method of Implementation #12, wherein performing a pipe operation comprises at least one of removing the pipe feature or replacing at least a section of the pipe having the pipe feature with a new section of pipe.

Implementation #14: A system comprising: a pulse generator configured to generate a first pressure pulse in a fluid in a pipe; a transducer configured to detect a first reflected pressure pulse reflected by a pipe feature in the pipe, wherein the pulse generator is configured to generate a second pressure pulse after the transducer detects the first reflected pressure pulse, wherein a timing of generation of the second pressure pulse is such that the second pressure pulse is superposed, at least in part, with the first reflected pressure pulse such that an amplitude of the second pressure pulse is greater than an amplitude of the first pressure pulse; a processor; and a computer-readable medium having instructions stored thereon that are executable by the processor to cause the processor to detect a pipe feature based on the second pressure pulse.

Implementation #15: The system of Implementation #14, wherein the second pressure pulse is reflected by the pipe feature to generate a second reflected pressure pulse.

Implementation #16: The system of Implementation #15, wherein the instructions comprise instructions to cause the processor to detect a position of the pipe feature in or on the pipe based on the second reflected pressure pulse.

Implementation #17: The system of any one of more of Implementations #14-16, wherein the pipe feature includes at least one of a deposition, a leak, or a blockage in the pipe.

Implementation #18: The system of any one of more of Implementations #14-17, wherein the pulse generator comprises a valve.

Implementation #19: The system of any one of more of Implementations #14-18, wherein a pipe operation is to be performed based on the pipe feature.

Implementation #20: The system of Implementation #19, wherein the pipe operation comprises at least one of removal of the pipe feature or replacement at least a section of the pipe having the pipe feature with a new section of pipe.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:
1. A method comprising:
   generating, via a pulse generator, a first pressure pulse in a fluid in a pipe;
   detecting, via a transducer, a first reflected pressure pulse based on the first pressure pulse, wherein at least a portion of the first pressure pulse is reflected by a pipe feature to generate the first reflected pressure pulse;
   generating, with the pulse generator, a second pressure pulse at a later time relative to generating the first pressure pulse, wherein timing of generating of the second pressure pulse is such that the second pressure pulse is superposed, at least in part, with the first reflected pressure pulse to generate a reinforced reflected pressure pulse, and wherein an amplitude of the reinforced reflected pressure pulse is greater than an amplitude of the first pressure pulse;
   detecting, via the transducer, a second reflected pressure pulse, wherein at least a portion of the reinforced reflected pressure pulse is reflected by the pipe feature to generate the second reflected pressure pulse; and
   detecting the pipe feature based on the second reflected pressure pulse.

2. The method of claim 1,
wherein the first reflected pressure pulse is further reflected by the pulse generator, and
wherein the timing of generating of the second pressure pulse is such that the second pressure pulse is superposed, at least in part, with the first reflected pressure pulse further reflected by the pulse generator.

3. The method of claim 1, wherein the second reflected pressure pulse exceeds a threshold for a signal-to-noise ratio.

4. The method of claim 1, wherein the pipe feature includes at least one of a deposition, a leak, or a blockage in the pipe.

5. The method of claim 1, further comprising:
detecting a position of the pipe feature in or on the pipe based on the second reflected pressure pulse.

6. The method of claim 1 further comprising:
performing a pipe operation based on the pipe feature.

7. The method of claim 6, wherein performing the pipe operation comprises at least one of removing the pipe feature or replacing at least a section of the pipe having the pipe feature with a new section of the pipe.

8. A method comprising:
generating, via a pulse generator, a first pressure pulse in a fluid in a pipe;
detecting, via a transducer, a first reflected pressure pulse based on the first pressure pulse, wherein at least a portion the first pressure pulse is reflected by a pipe feature to generate the first reflected pressure pulse;
performing following operations until a signal-to-noise ratio of the first reflected pressure pulse exceeds an acceptance threshold, generating, via the pulse generator, a subsequent pressure pulse in the fluid in the pipe, wherein timing of generating of the subsequent pressure pulse is such that the subsequent pressure pulse is superposed, at least in part, with the first reflected pressure pulse to generate a reinforced reflected pressure pulse, and wherein an amplitude of the reinforced reflected pressure pulse is greater than an amplitude of the first pressure pulse; and
detecting, via the transducer, a second reflected pressure pulse, wherein at least a portion of the reinforced reflected pressure pulse is reflected by the pipe feature to generate the second reflected pressure pulse; and
detecting the pipe feature based on the second reflected pressure pulse.

9. The method of claim 8, wherein the pipe feature includes at least one of a deposition, a leak, or a blockage in the pipe.

10. The method of claim 8, further comprising:
detecting a position of the pipe feature in or on the pipe based on the second reflected pressure pulse.

11. The method of claim 8 further comprising:
performing a pipe operation based on the pipe feature.

12. The method of claim 11, wherein performing the pipe operation comprises at least one of removing the pipe feature or replacing at least a section of the pipe having the pipe feature with a new section of the pipe.

13. A system comprising:
a pulse generator configured to generate a first pressure pulse in a fluid in a pipe;
a transducer configured to detect a first reflected pressure pulse reflected by a pipe feature in the pipe,
wherein the pulse generator is configured to generate a second pressure pulse after the transducer detects the first reflected pressure pulse, wherein a timing of generation of the second pressure pulse is such that the second pressure pulse is superposed, at least in part, with the first reflected pressure pulse to generate a reinforced reflected pressure pulse such that an amplitude of the reinforced reflected pressure pulse is greater than an amplitude of the first pressure pulse;
a processor; and
a non-transitory computer-readable medium having instructions stored thereon that are executable by the processor to cause the processor to detect the pipe feature based on a second reflected pressure pulse, wherein at least a portion of the reinforced reflected pressure pulse is reflected by the pipe feature to generate the second reflected pressure pulse.

14. The system of claim 13, wherein the instructions to cause the processor to detect a position of the pipe feature in or on the pipe based on the second reflected pressure pulse.

15. The system of claim 13, wherein the pipe feature includes at least one of a deposition, a leak, or a blockage in the pipe.

16. The system of claim 13, wherein the pulse generator comprises a valve.

17. The system of claim 13, wherein a pipe operation is to be performed based on the pipe feature.

18. The system of claim 17, wherein the pipe operation comprises at least one of removal of the pipe feature or replacement at least a section of the pipe having the pipe feature with a new section of the pipe.

* * * * *